July 18, 1967 W. COEHN 3,331,525
DEVICE FOR CONNECTING LIQUEFIED GAS TANK LININGS
WITH THE BULKHEADS OF A SHIP
Filed April 2, 1965
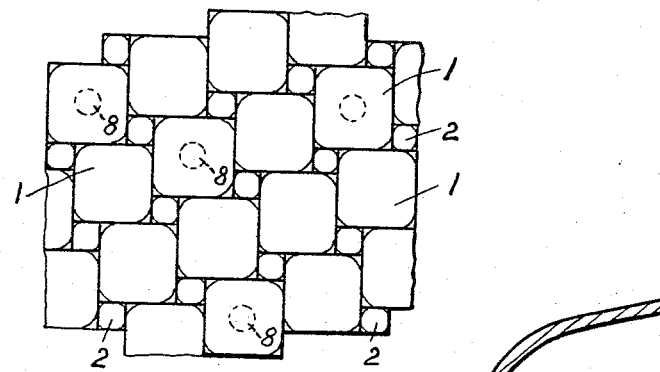
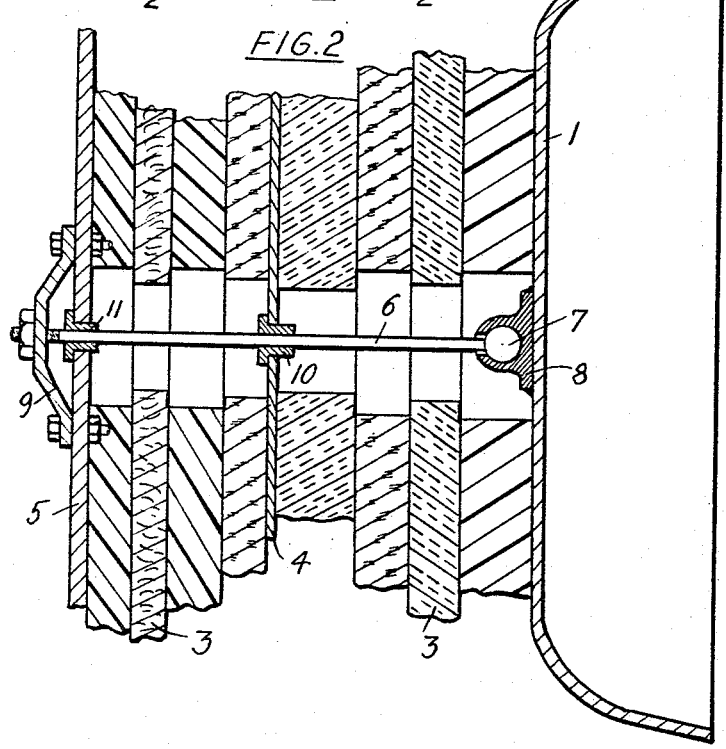
INVENTOR.
WERNER COEHN

3,331,525
DEVICE FOR CONNECTING LIQUEFIED GAS TANK LININGS WITH THE BULKHEADS OF A SHIP
Werner Coehn, Kiel, Germany, assignor to Kieler Howaldtswerke Aktiengesellschaft, Kiel, Germany, a firm
Filed Apr. 2, 1965, Ser. No. 445,186
3 Claims. (Cl. 220—15)

ABSTRACT OF THE DISCLOSURE

Liquefied gas tank linings which are composed of a plurality of trough-shaped component parts and are covered by an insulation incorporating a lock wall connected with a ship's bulkhead by a tie rod of hard polyurethane which passes through the insulation and the lock wall, one end of the tie rod terminating in a ball which is received in a ball socket on the outer surface of the tank lining to form a universal joint therewith, and the other end of the tie rod being secured to the bulkhead by screw means through the intermediary of a manhole cover so as to permit tightening of the tie rod.

---

This invention relates to a device for connecting liquefied gas tank linings, which are covered by an insulation incorporating a lock wall, with the bulkheads of a ship.

Such tank linings are mostly made of trough-shaped component parts, the edge portions of which form expansion joints for absorbing differences of temperature which may vary within a range of about 200° C., i.e. between the ambient temperature and the boiling point of methane. The covering of liquefied gas tanks mostly comprises a multilayer insulation with an incorporated safety lock wall.

To prevent the tank lining from being deformed and from breaking down with an empty tank and due to the vibrations occurring on a voyage, it is the object of the present invention to provide a tank lining in which no cold-bridges can form between the tank and the bulkheads or the walls of the ship.

To attain this object, the present invention provides a device for connecting liquefied gas tank linings which are composed of a plurality of trough-shaped component parts and covered by an insulation incorporating a lock wall, with a ship's bulkheads, wherein a tie rod of hard polyurethane passes through said insulation on said lock wall, one end of said tie rod terminating in a ball being received in a ball socket on the outer surface of the tank lining to form a universal joint therewith, while the other end of said tie rod is secured to a bulkhead through the intermediary of a manhole cover to which it is fixed by screw means so as to permit tightening of said tie rod.

When the tank lining is displaced owing to differences in temperature, the anchor means of the tie rod can move on the tank lining and the material of the tie rod avoids the forming of cold-bridges.

The tie rod is arranged in stuffing boxes of the lock wall and of the manhole cover. The ball socket in each case is centrally mounted in a trough-shaped component part of the tank lining. The anchoring provides for an inspection channel, since it is necessary to remove the insulation surrounding the tie rod. After mounting of the tie rod, the insulation is recompleted with the joints being arranged in staggered relationship.

An embodiment of the invention will now be described by way of example and with reference to the accompanying drawing, in which:

FIG. 1 is a fragmentary elevation view of a tank lining as seen from within the tank, and FIG. 2 is a vertical cross section showing the connection between the tank lining and a bulkhead of a ship.

With reference now to the drawing, the tank lining comprises individual trough-shaped component parts 1 and 2 forming the inner wall of a tank. The tank lining is covered by a multilayer insulation 3 incorporating a lock wall 4 which serves as a safety lock if the tank becomes leaky. A ship's bulkhead 5 adjoins the insulation 3.

Anchorage between the tank lining and the bulkhead 5 is achieved by a tie rod 6 consisting of hard polyurethane and terminating in a ball 7 at its end adjacent the tank. The ball 7 is supported in a ball socket 8 secured to the outer surface of the tank lining. The ball and socket joint formed by the ball 7 and the socket 8 will compensate the movements of the lining caused by differences in temperature.

The tie rod 6 passes through the insulation 3 and the lock wall 4 and finally through the bulkhead 5 where a manhole cover 9 is provided. The tie rod 6 can be fixed and tightened on the cover 9.

The passages for the tie rod 6 in the lock wall 4 and in the bulkhead 5 are provided with stuffing boxes 10 and 11, respectively.

The space cleared around the tie rod 6 by removing the insulation will be filled up again with insulating material after the tie rod 6 has been mounted.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A device connecting liquefied gas tank linings, which are composed of a plurality of trough-shaped component parts and covered by an insulation incorporating a lock wall, with a ship's bulkheads, wherein a tie rod of hard polyurethane passes through said insulation and said lock wall, one end of said tie rod terminating in a ball being received in a ball socket on the outer surface of the tank lining to form a universal joint therewith, the other end of said tie rod being secured to one of said bulkheads by screw means through the intermediary of a manhole cover so as to permit tightening of said tie rod.

2. A device as claimed in claim 1, wherein stuffing boxes are provided, respectively, in said lock wall and said bulkhead to receive said tie rod.

3. A device as claimed in claim 1, wherein said ball socket is fixed in the center of the trough-shaped component part.

References Cited
UNITED STATES PATENTS

| | | | |
|---|---|---|---|
| 2,858,136 | 10/1958 | Rind | 280—5 |
| 2,863,297 | 12/1958 | Johnston | 62—45 |
| 2,959,318 | 11/1960 | Clark | 220—15 |
| 3,021,027 | 2/1962 | Claxton | 220—15 |

JOHN E. MURTAGH, *Primary Examiner.*

FRANK L. ABBOTT, *Examiner.*